Figure 1:
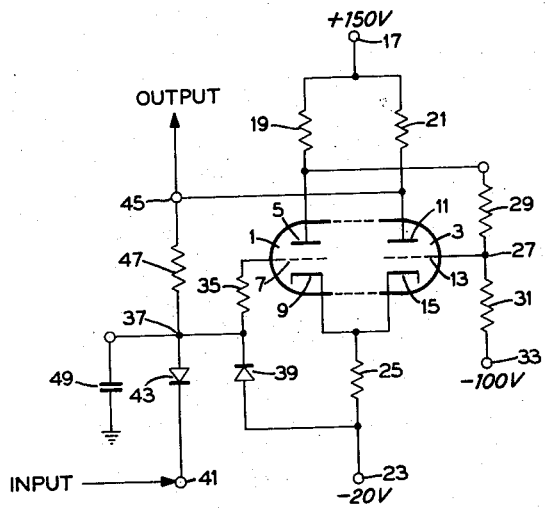

Aug. 12, 1958     G. L. CLAPPER     2,847,565

PULSE GAP DETECTOR

Filed Dec. 31, 1954

INVENTOR.
GENUNG L. CLAPPER

BY *Paul M. Brannen*

AGENT

United States Patent Office 2,847,565
Patented Aug. 12, 1958

2,847,565
PULSE GAP DETECTOR

Genung L. Clapper, Vestal, N. Y., assignor to International Business Machines Corporation, New York, N. Y., a corporation of New York Application December 31, 1954, Serial No. 479,148

7 Claims. (Cl. 250—27)

The present invention relates to pulse gap detectors, and more particularly to an improved pulse gap detector employing a minimum number of components arranged in a simplified manner to provide an economical yet highly reliable means for detecting a gap in an otherwise constant stream of electrical pulses.

Pulse gap detectors of the type herein contemplated are especially useful for checking the constancy of output of a source of synchronizing pulses, such as are employed to time the operation of various circuits in electronic computers, for example. Since the proper operation of systems of the type employing synchronizing pulses for timing various operations is dependent upon the uninterrupted supply of such pulses spaced at proper intervals, it is important that the output of the synchronizing pulse source be monitored, so that failure of the source to supply a continuous supply of pulses will be made evident.

Additionally, it is often desirable to detect a lowering of the basic frequency of the synchronizing pulses, and this invention may be employed to provide such detection.

Since the output of a pulse gap detector constructed in accordance with this invention consists of a pulse having a duration which is directly related to the interval in which no pulses are supplied to the input, the pulse gap detector may be employed as a demodulator of a series of input pulses in which the interpulse intervals are varied to produce a modulated pulse train.

It is a principal object of the present invention to provide an improved pulse gap detector which utilizes a minimum number of components to provide an economical yet highly reliable means for detecting a gap in an otherwise constant stream of pulses.

Another object of this invention is to provide a pulse gap detector which is capable of detecting a decrease in the basic frequency of input pulses supplied thereto.

A further object of my invention is to provide a pulse gap detector which may be employed as a demodulator of pulse trains.

Still another object of my invention is to provide a pulse gap detector having its elements arranged so that reliable detection of a missing pulse is obtained, even at relatively high pulse frequencies.

In practicing my invention, I provide a circuit arrangement including a first and a second electron discharge device, each of which may be of the triode type, and arranged so that the first and second electron discharge devices are normally non-conducting and conducting, respectively. The conductive state of the first electron tube discharge device is governed by the voltage developed across a capacitor which is supplied with charging energy through a suitable resistor, the time constant being selected so that the voltage across the capacitor will rise to a point where conduction just starts in the first electron discharge device in the normal interval between pulses. A serial train of uninterrupted negative-going input pulses applied across the capacitor causes the recurrent discharge of the capacitor so that the voltage across the capacitor is recurrently built up and abruptly reduced, with the voltage never remaining sufficiently positive for a duration long enough to establish conduction in the first electron discharge device. If a pulse is omitted in the serial train of input pulses, the voltage across the capacitor will rise to a sufficiently positive value and remain at this value for a sufficient time to initiate conduction in the first electron discharge device. Conduction of the first electron discharge device causes the cutoff of the normally conducting second electron discharge device, and a voltage change or pulse accordingly takes place in an output circuit connected thereto.

The supply of another input pulse will drop the voltage across the capacitor so that the first and second electron discharge devices are restored to their non-conductive and conductive states, respectively.

Thus the apparatus functions to provide an output pulse each time that a gap occurs in the supply of input pulses, and the duration of the output pulse is dependent upon the extent of the gap in the input pulse train.

A feature of my invention is the use of the output voltage of the second or normally conducting electron discharge device as a source for charging the timing capacitor so that the voltage source for the capacitor is raised in potential when the circuit arrangement is activated by a missing pulse, to thereby increase still more the input voltage supplied to the first electron discharge device, with the result that restoration of the circuit to its normal condition will take place only by the supply of an input pulse of sufficient magnitude.

Other objects of the invention will be pointed out in the following description and claims and illustrated in the accompanying drawings, which disclose, by way of examples, the principle of the invention and the best mode, which has been contemplated, of applying that principle.

Figure 2:
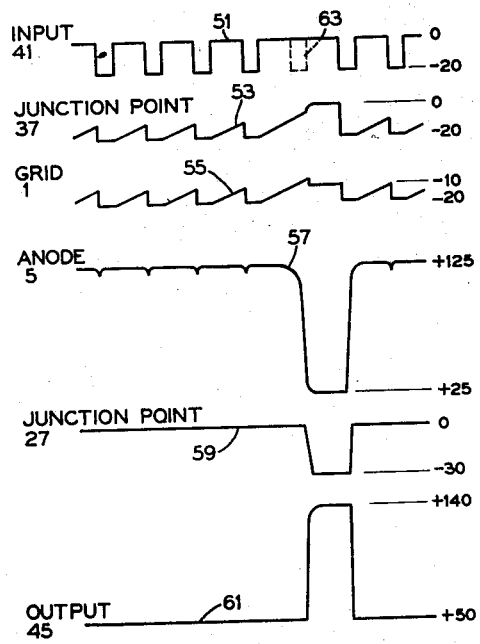
Figure 3:
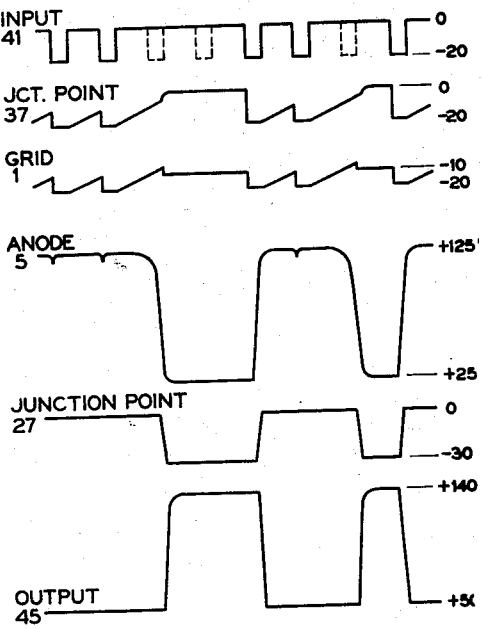

In the drawings:

Fig. 1 is a schematic diagram of a pulse gap detector arranged in accordance with a preferred embodiment of my invention, Fig. 2 is a graphical representation of the approximate waveforms encountered at various points in the apparatus, illustrating the operation of the apparatus as a pulse gap detector, and Fig. 3 is a graphical representation of the approximate waveforms encountered at various points in the apparatus, illustrating the operation of the apparatus as a demodulator.

Referring to Fig. 1 of the drawings, there is shown a first electron discharge device 1 and a second electron discharge device 3. As herein shown and described, the first and second electron discharge devices may comprise the left-hand and right-hand triode sections of a conventional dual triode vacuum tube. The left-hand or first triode 1 includes an anode 5, control electrode or grid 7 and cathode 9 and the right-hand or second triode 3 includes an anode 11, control electrode or grid 13, and cathode 15. The dual triode structure includes the usual heater elements, not shown for purposes of simplifying the disclosure.

The anodes 5 and 11 of the triodes are connected to a positive potential terminal 17 through plate load resistors 19 and 21, respectively. The cathodes 9 and 15 of triodes 1 and 3 are connected together and thence to a first negative potential terminal 23, through a common cathode impedance, here shown as a common cathode resistor 25.

The control grid 13 of triode 3 is connected to a first junction point 27 of voltage dividing resistors 29 and 31, which are connected in series between the anode or plate 5 of triode 1 and a second negative potential terminal 33.

Control grid 7 of triode 1 is connected through a limiting resistor 35 to a second junction point 37. A limiting diode or asymmetric device is connected between junction point 37 and negative potential terminal 23, with diode 39 poled to permit current flow in the low resistance direction from terminal 23 to junction point 37.

An input terminal 41 is connected through a gate diode or asymmetric device 43 to junction point 37, gate diode 43 being poled to permit current flow in the low resistance direction from junction point 37 to terminal 41.

An output terminal 45 is connected to the anode 11 of triode 3 and is also connected to junction point 37 through a capacitor charging resistor 47.

A capacitor 49 is connected between the junction point 37 and ground, which is considered to be at zero potential with respect to the other potentials involved in this apparatus.

Power for the operation of this apparatus may be supplied from any suitable type of power supply which affords suitable positive and negative potentials with the common or reference potential connected to ground. As shown, terminal 17 may have a positive potential value of +150 volts, terminal 23 may have a negative potential value of −20 volts, and terminal 33 may have a negative potential value of −100 volts.

In operation, it will first be assumed that a continuous train of negative-going pulses are being supplied to input terminal 41, the pulses having a magnitude of −20 volts with respect to ground, as shown in Fig. 2 by waveform 51. Each negative pulse lowers the voltage at junction point 37 to substantially the magnitude of the negative-going pulse i. e., −20 volts, as a result of the forward conduction of diode 43, and the voltage at junction point 37 remains at a value of approximately −20 volts for the duration of the pulse.

The diode 39 serves as a limiting device, to prevent junction point 37 from going more negative than some predetermined value, in the present example, −20 volts. Thus the input pulses are limited to a maximum amplitude of −20 volts. It will be apparent to those skilled in the art that other types of limiting arrangements may be employed, and it will also be apparent that if the input pulses are limited elsewhere, no limiting will be required in this arrangement, and the diode 39 may accordingly be eliminated.

During the interpulse interval, the capacitor 49 will charge to some relatively positive value of potential, with respect to the potential of the input pulses, e. g., 0 volt, as a result of current flow from output terminal 45 through resistor 47. A rise in voltage of junction point 37 is accordingly produced, at a rate dependent upon the capacitance of capacitor 49, the value of resistor 47, and the voltage of output terminal 45. The next negative-going input pulse discharges capacitor 49 and abruptly lowers the potential of junction point 37 to −20 volts. This action is illustrated in waveform 53 of Fig. 2.

Since grid 7 of triode section is connected to junction point 37 through resistor 35, the voltage applied to this grid will vary in a manner similar to that described above for junction point 37 as a result of the supply of recurrent pulses to input terminal 41. The resistor 35 will limit the flow of current to grid 7 as point 37 rises in potential, so that under normal conditions, grid 7 is never driven more positive than some predetermined value, say for example −10 volts. As previously pointed out, limiter diode 39 prevents junction point 37 and hence grid 7 from falling below the potential of terminal 23, that is, below −20 volts. It will be seen therefore that normally the potential of grid 7 will vary between approximately −20 and −10 volts in the manner illustrated by waveform 55 of Fig. 2.

The parts are selected and arranged so that the left-hand triode section in normally cut off, or non-conducting, and the sawtooth pulses supplied to the grid 7 as shown by waveform 55 of Fig. 2 do not rise sufficiently high to initiate full conduction of triode section 1. Under such circumstances, anode 5 of tube 1 will be at some positive potential less than the voltage of terminal 17, e. g., +125 volts, due to the current flow through resistors 19, 29, and 31 to negative-going potential terminal 33. With optimum adjustment, small negative-going pulses or "pips" will normally appear at anode 5, as shown by waveform 57 of Fig. 2, as a result of slight conduction of triode 1 occurring just before an input pulse abruptly drops the potential of grid 7.

Under normal conditions, junction point 27 and hence grid 13 of triode 3 is held at or near zero voltage as a result of grid-to-cathode current in triode 3 as shown by waveform 59 of Fig. 2. The parts are selected and arranged so that triode 3 is normally conducting with the anode 11 and hence output terminal 45 at a positive potential of approximately +50 volts, as shown by waveform 61 of Fig. 2. Plate current flow through the common cathode resistor 25 results in a voltage drop across the resistor so that cathode 15 of triode 3 and also cathode 9 of triode 1 are at approximately zero or ground potential.

From the foregoing description, it will be seen that under normal conditions, with pulses being supplied to the input terminal 41 at the proper rate and having the proper duration, the voltage at the output terminal will have some nominal steady value, such as +50 volts.

Let it now be assumed that omission of a pulse occurs such as shown at 63 in waveform 51 of Fig. 2.

Under this condition, the voltage across capacitor 49 will continue to rise, as shown by waveform 53 of Fig. 2, with a resulting rise in voltage of grid 7 of triode 1. Triode 1 will accordingly begin conducting, and the anode voltage will drop by a relatively large amount as shown by waveform 57, to some lower value, e. g., +25 volts. Junction point 27 and hence grid 13 of triode 3 will drop in potential, as shown by waveform 59, so that triode 3 is cut off and ceases conduction. Accordingly, the output voltage at terminal 45 will rise from its steady-state value to some relatively high value, such as, for example, +140 volts, as shown by waveform 61. This high amplitude output pulse may be utilized to operate an alarm, for example, to indicate that a gap has occurred in the pulse train.

The waveforms 53 and 55 of Fig. 2 show a flat-topped voltage wave during the output pulse time. This flattening is caused by grid current flowing in triode 1, until a saturation point is reached, after which the voltage at junction point 37 and grid 1 remains constant during the remainder of the output pulse time.

The next input pulse following the missing pulse will cut off conduction in triode 1 by dropping the voltage of junction point 37 and grid 7 in the manner hereinbefore described. The consequent rise in voltage at junction point 27 and grid 13 of triode 3 will reinitiate conduction in triode 3, so that the output voltage will be dropped to its steady-state value, thus terminating the output pulse.

Continuation of the supply of input pulses will cause the apparatus to function as originally described.

It can also be seen that in the pulse gap detector arrangement herein disclosed, the voltage supplied to the junction point 37 is dependent upon the output voltage, since junction point 37 is connected to the output terminal 45 through resistor 47. In this manner, when an output pulse is generated by a missing pulse, the voltage at the junction point 37 is increased, thereby increasing the voltage at grid 7 of triode 1, to maintain conduction of this triode section.

It can be seen from the foregoing that my invention provides an economical means for detecting gaps or omissions in pulse trains. Only two triodes are required, and as previously pointed out, both triodes may be in the same envelope, so that only a single vacuum tube of the dual triode need be employed. Only a relatively small number of circuit components are required in addition to the vacuum tube, and the arrangement lends itself well to building the device as a plug-in unit.

Reliability of operation is insured by utilizing the output voltage as a charging source for the input capacitor 49, so that when once actuated, the device will remain operated until an input pulse of normal magnitude is again supplied thereto.

It will be apparent a pulse gap detector constructed according to my invention will also detect a decrease in the basic frequency or repetition rate of a train of pulses, since if a pulse does not occur within a predetermined interval following the last preceding pulse, the device will generate an output signal.

Moreover, it can be seen that the duration of the output pulse produced by this device is representative of the time which elapses between pulses, so that the arrangement may be employed as a demodulator of pulse waveforms where the modulation is produced by the omission of one or more pulses at various times. Such operation is illustrated by the waveforms shown in Fig. 3, which are taken at the same points in the device as the waveforms shown in Fig. 2. As can readily be seen, the omission of two pulses in the input pulse train will result in the production of an output pulse which has a duration twice the length of the output pulse produced by the omission of a single input pulse.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A pulse gap detector for detecting an interval greater than a predetermined time between input pulses supplied thereto, comprising, in combination, a capacitor and a resistor connected in series, a source of operating voltage, means for charging said capacitor from said source through said resistor, means responsive to the supply of input pulses for recurrently discharging said capacitor, voltage sensitive means connected to said capacitor and arranged to provide an output signal when and only when the voltage across said capacitor exceeds a predetermined level as a result of said capacitor being charged for a time greater then said predetermined time, and means for changing the value of said operating voltage in response to said output signal.

2. In combination, a first and a second electron discharge device, each having at least an anode, a cathode and a control electrode, a source of anode potential, a first load impedance connected between the anode of said first electron discharge devices and said source of anode potential, a second load impedance connected between the anode of said second electron discharge device and said source of anode potential, a first negative potential, a common cathode impedance connected between the cathodes of said first and second electron discharge devices and said first negative potential, said common cathode impedance having a substantial ohmic value, a second negative potential, voltage divider means connected between the anode of said first electron discharge device and said second negative potential, means for connecting the control electrode of said second electron discharge device to said voltage divider, an output circuit connected to the anode of said second electron discharge device, an input circuit connected to the control electrode of said first electron discharge device, a capacitor connected to said input circuit, and means for charging said capacitor including a resistor connected between said capacitor and the anode of said second electron discharge device, said first and second electron discharge devices being arranged to be normally conducting and non-conducting respectively, and a source of recurrent negative-going input pulses connected to said input terminal, whereby said capacitor is recurrently charged and discharged in response to the supply of input pulses to said input terminal, the parts being selected and arranged so that the voltage across said capacitor will rise to a value sufficient to initiate conduction in said first electron discharge device if the interval between said input pulses exceeds a predetermined time.

3. A pulse gap detector for detecting a gap in a serial train of pulses spaced at predetermined time intervals, comprising, in combination, a capacitor and a resistor time constant circuit and a source of charging potential therefor, said capacitor being charged from said source at a predetermined rate through said resistor, means responsive to said pulses for rapidly discharging said capacitor, whereby the voltage across said capacitor does not exceed a predetermined value during the normal predetermined time interval between pulses, voltage sensitive means connected to said capacitor for providing an output signal when and only when the voltage across said capacitor exceeds said predetermined value, and means responsive to said output signal for increasing the voltage of said source of charging potential.

4. In combination, two electron discharge devices each having at least an anode, a cathode and a control grid; a source of operating potential having at least a reference or ground potential terminal, a positive potential terminal which has a positive potential with respect to said reference potential terminal, a first negative potential terminal having a potential which is negative with respect to said reference potential terminal, and a second negative potential terminal which is more negative with respect to said reference potential terminal than said first negative potential terminal; a load impedance for each of said electron discharge devices connected between the anode and said positive potential terminal, a common cathode impedance connected to the cathodes of said electron discharge devices and said first negative potential terminal, means including a voltage divider connected between the anode of said first electron discharge device and said second negative potential terminal for supplying a controlling potential to the control grid of said second electron discharge device, an output terminal connected to the anode of said second electron discharge device, the parts being selected and arranged so that said first electron discharge device is normally non-conducting and said second electron discharge device is normally conducting, and means for rendering said first electron discharge device conducting and said second electron discharge device non-conducting, comprising an input terminal, a limiting diode connected between said first negative potential terminal and said input terminal, a capacitor and a resistor connected in series between said ouput terminal and said ground potential terminal, and means connecting the junction point of said capacitor and said resistor to said input terminal and the control grid of said first electron discharge device.

5. In a pulse gap detector for detecting intervals greater than a predetermined time in a serial train of negative-going pulses, in combination, an input terminal to which said pulses are supplied, a junction point connected to said input terminal through a gate diode poled to pass said negative-going pulses, a capacitor connected to said junction point, an output terminal, a capacitor charging resistor connected between said output terminal and said junction point, and voltage sensitive means connected to said junction point and said output terminal for maintaining said output terminal at a given positive potential when the potential at said junction point does not exceed a predetermined value, and for increasing the positive potential of said output terminal when the potential at said junction exceeds said predetermined value, said resistor and capacitor being selected to have a time constant such that the potential at said junction point does not rise above said predetermined value during the normal interval between pulses supplied to said input terminal.

6. In a pulse gap detector for detecting intervals greater than a predetermined time in a serial train of negative-going pulses, in combination, an input terminal to which said pulses are supplied, a junction point connected to said input terminal through a gate diode poled to pass said negative-going pulses, a source of clamping potential connected to said junction point through a limiter diode to thereby limit the maximum negative potential at said junction point, a capacitor connected to said junction point, an output terminal, a capacitor charging resistor connected between said output terminal and said junction point, and voltage sensitive means connected to said junction point and said output terminal for maintaining said output terminal at a given positive potential when the potential at said junction point does not exceed a predetermined value, and for increasing the positive potential of said output terminal when the potential at said junction exceeds said predetermined value, said resistor and capacitor being selected to have a time constant such that the potential at said junction point does not rise above said predetermined value during the normal interval between pulses supplied to said input terminal.

7. In a pulse gap detector for detecting an interval greater than a predetermined time between successive pulses in a serial train of pulses, in combination, a first and second vacuum tube amplifier stage connected in cascade, said first amplifier stage being normally biased to a non-conductive condition and said second amplifier stage being normally biased to a conductive condition, an output terminal for said second stage having a normal predetermined positive potential, an input control electrode associated with said first stage and effective when a potential at or above a predetermined value is supplied thereto to change the state of conduction of said first and second stages to their conducting and non-conducting conditions, respectively, an input terminal to which said pulses are supplied, a junction point connected to said input terminal and said control electrode, a capacitor connected to said junction point, and a capacitor charging resistor connected between said output terminal and said junction point, said resistor and capacitor having a time constant such that the potential of said control electrode approaches said predetermined value during each normal pulse interval and is abruptly reduced to some lesser predetermined value during each pulse.

References Cited in the file of this patent

UNITED STATES PATENTS

| | | |
|---|---|---|
| 2,126,243 | Busse et al. | Aug. 9, 1938 |
| 2,141,343 | Campbell | Dec. 27, 1938 |
| 2,153,217 | Mark | Apr. 4, 1939 |
| 2,359,447 | Seeley | Oct. 3, 1944 |
| 2,506,439 | Bergfors | May 2, 1950 |
| 2,589,465 | Weiner | Mar. 18, 1952 |
| 2,589,833 | Longmire et al. | Mar. 18, 1952 |
| 2,596,167 | Philpott | May 13, 1952 |
| 2,629,825 | Eckert et al. | Feb. 24, 1953 |
| 2,666,135 | Barton | Jan. 12, 1954 |